(12) United States Patent
Watanabe et al.

(10) Patent No.: US 11,465,193 B2
(45) Date of Patent: Oct. 11, 2022

(54) CONVEYING DEVICE

(71) Applicant: HONDA MOTOR CO., LTD., Tokyo (JP)

(72) Inventors: Yohei Watanabe, Tochigi (JP); Keiichi Takagi, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 22 days.

(21) Appl. No.: 17/211,849

(22) Filed: Mar. 25, 2021

(65) Prior Publication Data

US 2021/0300691 A1    Sep. 30, 2021

(30) Foreign Application Priority Data

Mar. 27, 2020  (JP) .............. JP2020-058116

(51) Int. Cl.
| | | |
|---|---|---|
| *B21D 45/10* | (2006.01) | |
| *B65G 47/91* | (2006.01) | |
| *B25J 15/06* | (2006.01) | |
| *B21D 45/04* | (2006.01) | |

(52) U.S. Cl.
CPC ............ *B21D 45/10* (2013.01); *B21D 45/04* (2013.01); *B25J 15/0658* (2013.01); *B65G 47/912* (2013.01); *B65G 47/917* (2013.01); *B65G 47/918* (2013.01)

(58) Field of Classification Search
CPC .. B65G 47/912; B65G 47/917; B65G 47/918; B21D 45/02; B21D 45/04; B21D 45/10; B25J 15/0658; B25B 11/005
See application file for complete search history.

(56) References Cited

U.S. PATENT DOCUMENTS

| | | | |
|---|---|---|---|
| 10,512,965 B2 * | 12/2019 | Prokop | .................. B23K 26/38 |
| 10,562,194 B2 * | 2/2020 | Kawamoto | .......... B25J 15/0052 |

FOREIGN PATENT DOCUMENTS

| | | | | |
|---|---|---|---|---|
| JP | S642742 A | * | 1/1989 | |
| JP | S642742 A | | 1/1989 | |
| JP | 2005334888 A | * | 12/2005 | |

\* cited by examiner

*Primary Examiner* — Gene O Crawford
*Assistant Examiner* — Keith R Campbell
(74) *Attorney, Agent, or Firm* — CKC & Partners Co., LLC

(57) ABSTRACT

There is provided a conveying device that reliably discharges only scrap when simultaneously conveying the scrap and a pressed product without sacrificing cycle time. A conveying device for use in press forming includes: a conveying part that holds a product part and a scrap part of a workpiece after a cutting process, and conveys the product part and the scrap part to a next process; a nozzle part that is provided in the conveying part, and discharges compressed fluid toward the scrap part; and a controller that performs a control to release holding of the scrap part during conveyance of the workpiece and to blow compressed fluid toward the scrap part.

4 Claims, 10 Drawing Sheets

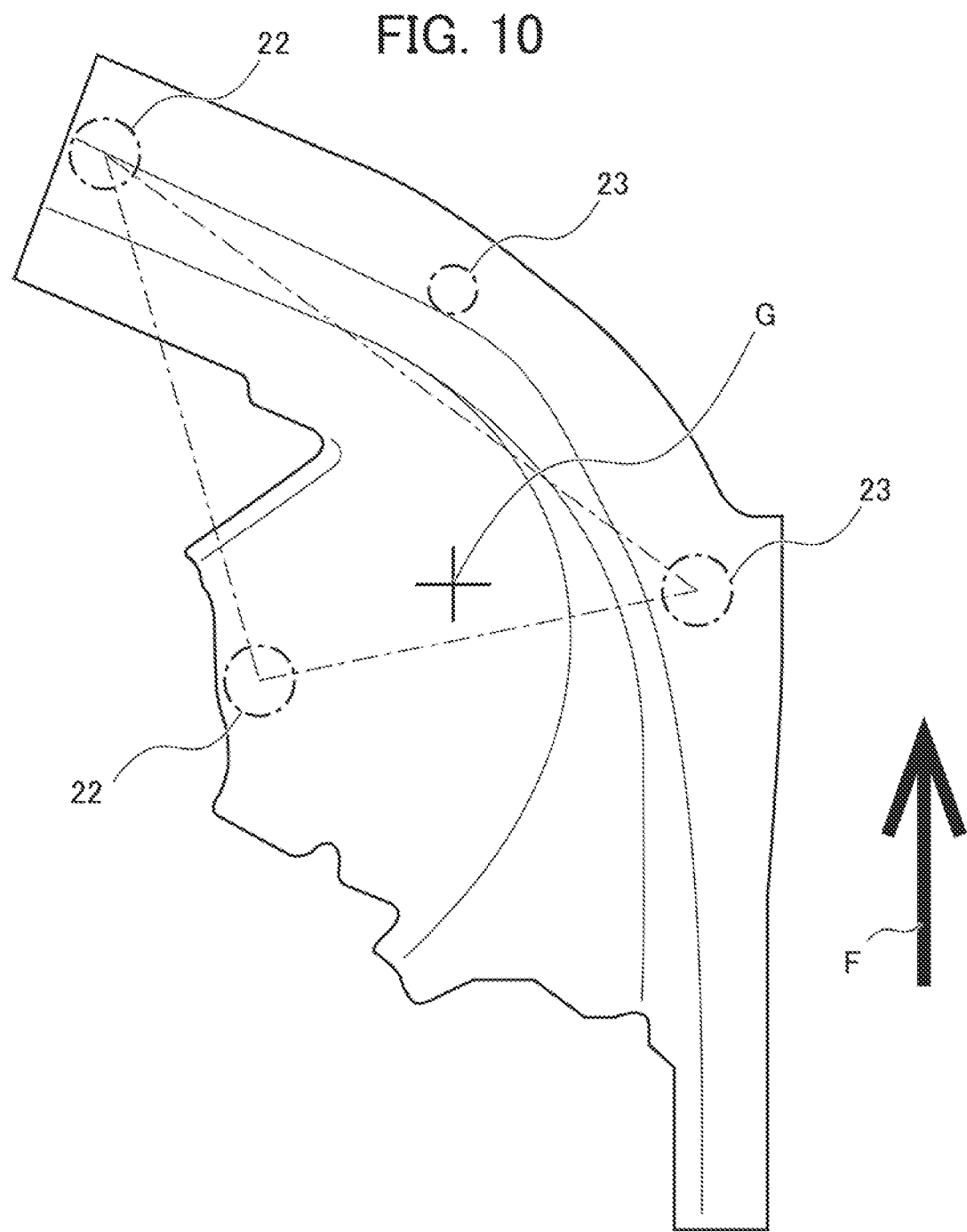

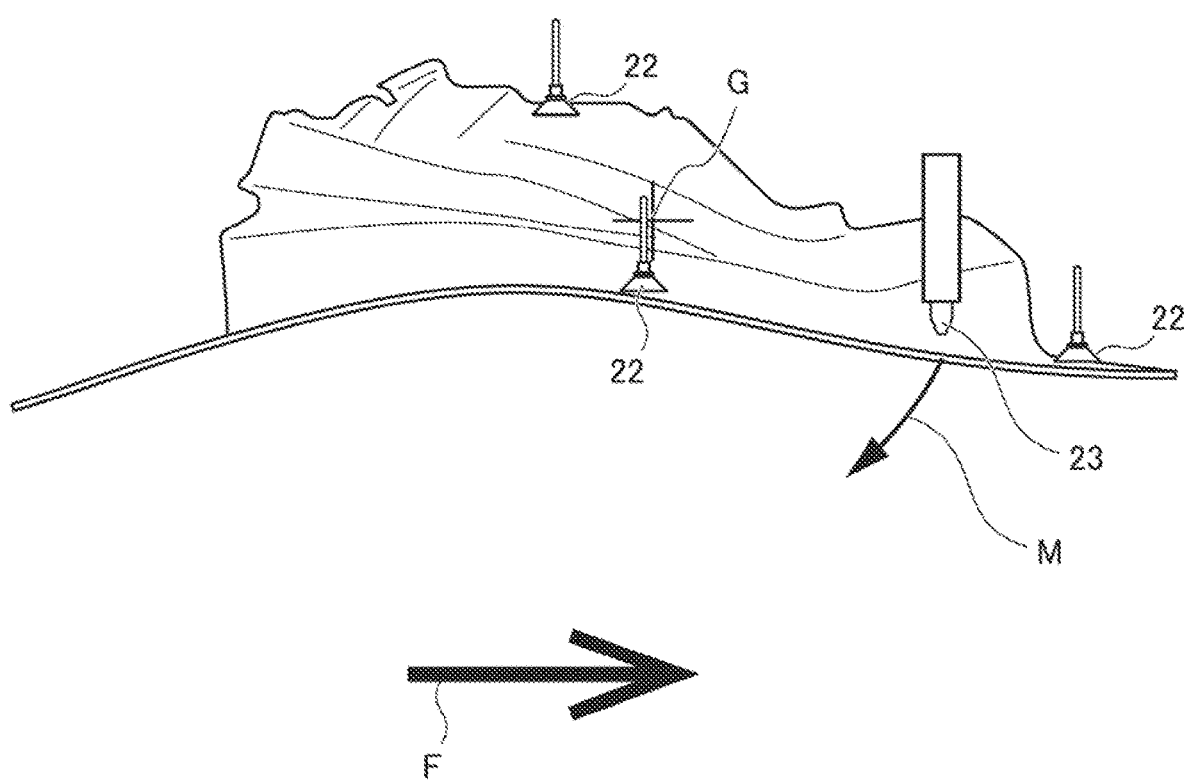

CONVEYING DEVICE

This application is based on and claims the benefit of priority from Japanese Patent Application No. 2020-058116, filed on 27 Mar. 2020, the content of which is incorporated herein by reference.

BACKGROUND OF THE INVENTION

Field of the Invention

The present invention relates to a conveying device for use in press forming.

Related Art

In a conventional press process setting, a drawing process and a cutting process are independently set as a first process and a second process, respectively. A tunnel structure is set inside a die, and scrap (mill ends) generated in the cutting process is discharged to the outside of the die through a tunnel as it is after cutting, and is processed to an underground pit from openings installed on the upstream and downstream sides of a press M/C in a second process. In conveyance between pressing processes, only a product panel is suctioned and conveyed.

There are needs to reduce die investment cost, store dies in a factory, and reduce space by integrating the drawing process and the cutting process in the first process by a process integration technology. Therefore, when process integration is performed, scrap is generated by separating a material terminal part required for draw forming from the product panel by cut forming, but the cutting process is integrated in the first process, so that scrap conventionally generated in the second process is generated in the first process. However, the press M/C in the first process is designed exclusively for the drawing process, and therefore does not have an underground pit for processing the scrap, and the scrap needs to be conveyed and processed in the second and subsequent processes.

Therefore, there is disclosed a technology for suctioning and simultaneously conveying the scrap in addition to the product panel in the first process toward the second process, and releasing only the scrap in the middle of the conveyance and putting the scrap into an underground pit opening on the upstream side of the press M/C in the second process (for example, Japanese Unexamined Patent Application, Publication No. S64-002742). In this technology, after the product panel is conveyed in the second process, when the conveying device is returned to the first process while the scrap is suctioned by the conveying device, the scrap is dropped into a take-out hole provided between the first process and the second process.

Therefore, when the scrap is discharged, the forward and backward movement of the conveying device is stopped, so that it is difficult to improve cycle time. When the scrap tries to be released from the suction during conveyance and discharged, the conveyance between the processes is sufficiently accelerated when the scrap suctioned and conveyed exits the first process, and therefore simple release from the suction does not result in a dropping trajectory of the scrap toward the underground pit opening on the upstream side of the press M/C in the second process, and, for example, the scrap scatters on the die in the second process.

Patent Document 1: Japanese Unexamined Patent Application, Publication No. S64-002742

SUMMARY OF THE INVENTION

An object of the present invention is to provide a conveying device that reliably discharges only scrap when simultaneously conveying the scrap and a pressed product without sacrificing cycle time.

The present invention solves the above-mentioned problem by the following solutions. In addition, in order to facilitate understanding, the description will be given with reference numerals corresponding to an embodiment of the present invention, but the description is not limited to the embodiment.

A first aspect of the invention relates to a conveying device (20) for use in press forming, the conveying device (20) including: a conveying part (200) that includes respective holding parts (21, 22) for holding a product part (W1) and a scrap part (W2) of a workpiece after a cutting process, and conveys the product part and the scrap part to a next process; a nozzle part (23) that is provided separately from the holding parts (21, 22) in the conveying part (200), and discharges compressed fluid toward the scrap part (W2); and a controller (27) that performs a control to release holding of the scrap part (W2) during conveyance of the workpiece and to blow the compressed fluid toward the scrap part (W2).

According to a second aspect of the invention, in the conveying device (20) described in the first invention, the nozzle part (23) is disposed so as to be directed toward a portion on a downstream side or an upstream side in a conveying direction of the scrap part (W2) with respect to a gravity center position of the scrap part (W2).

According to a third aspect of the invention, in the conveying device (20) described in the first invention or the second invention, the conveying part (200) holds and conveys the scrap part (W2) at a position lower than the product part (W1).

According to the present invention, it is possible to provide a conveying device that reliably discharges only scrap when simultaneously conveying the scrap and a pressed product without sacrificing cycle time.

BRIEF DESCRIPTION OF THE DRAWINGS

FIG. 10 is a top view illustrating arrangement of scrap vacuum cups 22 and the nozzle part 23 in a more specific form of the scrap part W2; and FIG. 11 is a side view illustrating arrangement of the scrap vacuum cups 22 and the nozzle part 23 in a more specific form of the scrap part W2.

DETAILED DESCRIPTION OF THE INVENTION

Hereinafter, the best mode for carrying out the present invention will be described with reference to the drawings and the like.

EMBODIMENT

Figure 1:
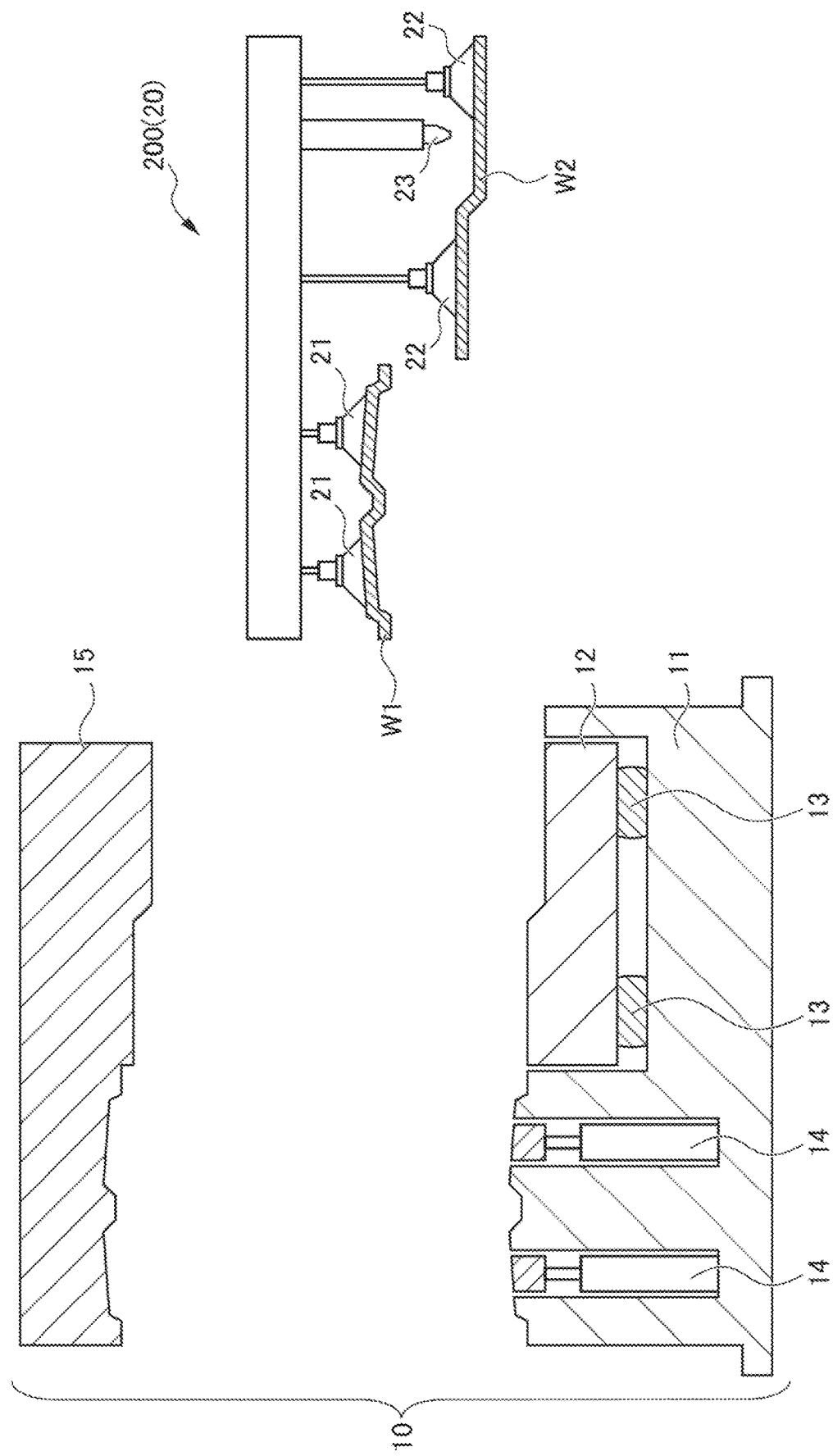
FIG. 1 is a diagram illustrating a press forming device 10 and a conveying device 20 according to the present invention.
Figure 2:
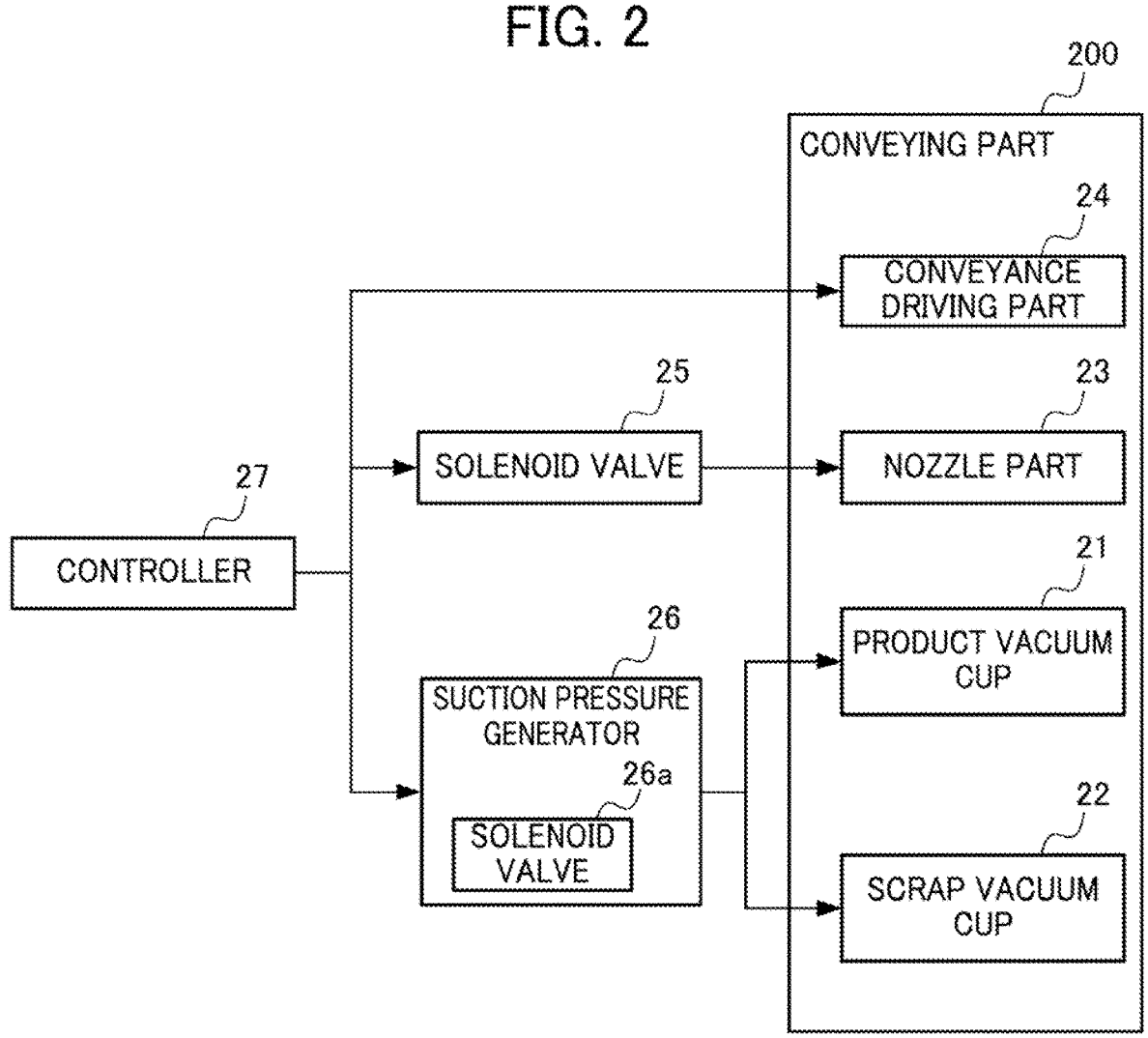
FIG. 2 is a block diagram illustrating control of the conveying device 20.

FIG. 1 is a diagram illustrating a press forming device 10 and a conveying device 20 according to the present invention. FIG. 2 is a block diagram illustrating control of the conveying device 20. Each figure illustrated below including FIG. 1 is a diagram schematically illustrated, and the size and the shape of each part are illustrated by being appropriately exaggerated or omitted in order to facilitate understanding. In the following description, specific numerical values, shapes, materials and the like will be described, but these can be appropriately changed.

In the middle of conveyance of both a product part W1 and a scrap part W2 divided by simultaneously performing forming and trimming (cutting) of a workpiece by the press forming device 10, the conveying device 20 of this embodiment properly drops only the scrap part W2 at a predetermined position. The press forming device 10 includes a lower die 11, a blank holder 12, cushion parts 13, lift-up parts 14, and an upper die 15, and performs forming and cutting at the same time. Herein, in the illustration, it is assumed that the conveying device 20 simultaneously performs cutting for the scrap part W2 and forming for the product part W1 remaining by the cutting for the scrap part W2, with respect to a blank material before processing. Although the scrap part W2 is illustrated as one herein, a plurality of scrap parts W2 may be adopted.

The lift-up parts 14 are composed of air cylinders or the like, and lift up the formed product part W1 to a position higher than the cut scrap part W2.

The conveying device 20 includes product vacuum cups 21, scrap vacuum cups 22, a nozzle part 23, and a conveyance driving part 24 as a conveying part 200. The conveying device 20 further includes a solenoid valve 25, a suction pressure generator 26, and a controller 27, in addition to the conveying part 200.

The product vacuum cups 21 are provided in the conveying part 200, and suction and hold the product part W1 by negative pressure. The scrap vacuum cups 22 are provided in the conveying part 200, and suction and hold the scrap part W2 by negative pressure. The product vacuum cups 21 and the scrap vacuum cups 22 are connected to the suction pressure generator 26 via a pipe (not illustrated), and are holding parts capable of suctioning and holding the product part W1 and the scrap part W2 respectively by being depressurized. In the suction pressure generator 26, the negative pressure of the product vacuum cups 21 and the negative pressure of the scrap vacuum cups 22 are independently controlled by the controller 27. Therefore, it is possible to release the holding of the scrap part W2 by the scrap vacuum cups 22 while maintaining a state in which the product vacuum cups 21 hold the product part W1.

The nozzle part 23 is provided in the conveying part 200, and discharges compressed fluid (high pressure air) toward the scrap part W2. In this embodiment, the nozzle part 23 is disposed so as to be directed toward a portion on the downstream side in the conveying direction of the scrap part W2 with respect to a gravity center position of the scrap part W2. The position toward which the nozzle part 23 is directed may be a portion on the upstream side in the conveying direction with respect to the gravity center position of the scrap part W2. In the nozzle part 23, a pipe (not illustrated) is connected to a pressurizing device (not illustrated), and high pressure air can be discharged. The solenoid valve 25 described later is provided in the middle of the pipe to which the nozzle part 23 is connected, and the outflow of air is controlled by the control of the controller 27.

The conveyance driving part 24 is provided in the conveying part 200, and performs convey driving of the conveying part 200 in accordance with the control of the controller 27.

The solenoid valve 25 is provided in the middle of the pipe connected to the nozzle part 23, and switches ON/OFF of air discharge from the nozzle part 23 in accordance with the control of the controller 27. In this embodiment, as illustrated in FIG. 2, the solenoid valve 25 is provided outside the conveying part 200 in order to reduce the weight of the conveying part and simplify the wiring. However, the solenoid valve 25 may be provided immediately near the nozzle part 23.

The suction pressure generator 26 is provided outside the conveying part 200, and is independently connected to each of the product vacuum cups 21 and the scrap vacuum cups 22 via a pipe (not illustrated). The suction pressure generator 26 generates negative pressure that is a source of suction force of each of the product vacuum cups 21 and the scrap vacuum cups 22. The suction pressure generator 26 is controlled by the controller 27 to independently switch the suction ON/OFF of the product vacuum cups 21 and the scrap vacuum cups 22. Further, the suction pressure generator 26 is provided with a solenoid valve 26a such that suction ON/OFF can be switched instantly.

Now, operation of the press forming device 10 and the conveying device 20 will be described in order of processes.

Figure 3:
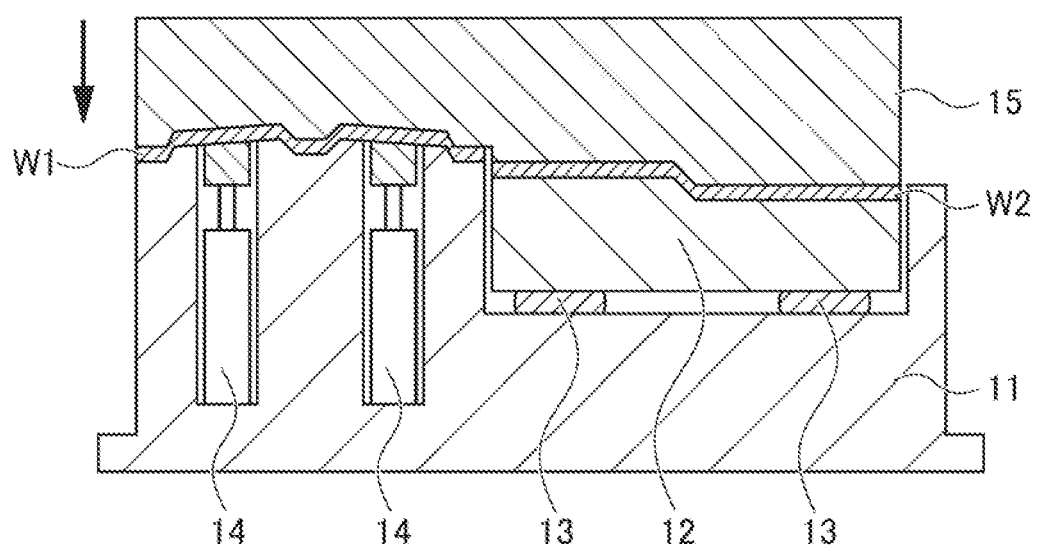
FIG. 3 is a diagram illustrating a state in which a forming process and a cutting process by the press forming device 10 are performed at the same time.

FIG. 3 is a diagram illustrating a state in which the forming process and the cutting process by the press forming device 10 are performed at the same time. Of course, at this point, the conveying part 200 is retreated.

Figure 4:
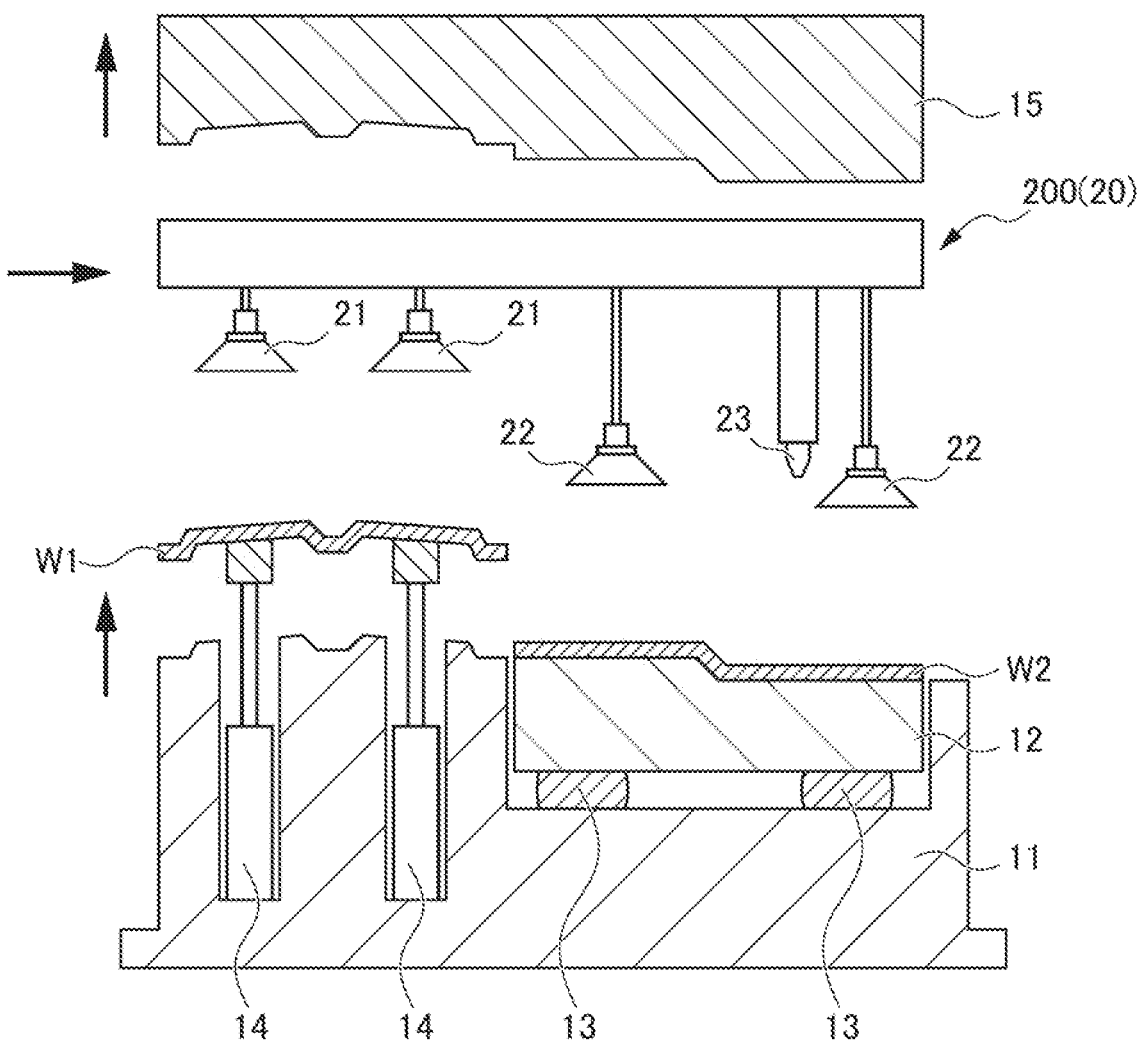
FIG. 4 is a diagram illustrating a state in which an upper die 15 is raised, and a conveying part 200 is moved to a space between a lower die 11 and the upper die 15.

FIG. 4 is a diagram illustrating a state in which the upper die 15 is raised, and the conveying part 200 is moved to a space between the lower die 11 and the upper die 15. When the forming process and the cutting process are completed, the upper die 15 rises, and the conveying part 200 moves to the space between the lower die 11 and the upper die 15. Further, the lift-up parts 14 lift the formed product part W1 to a position higher than the cut scrap part W2.

Figure 5:
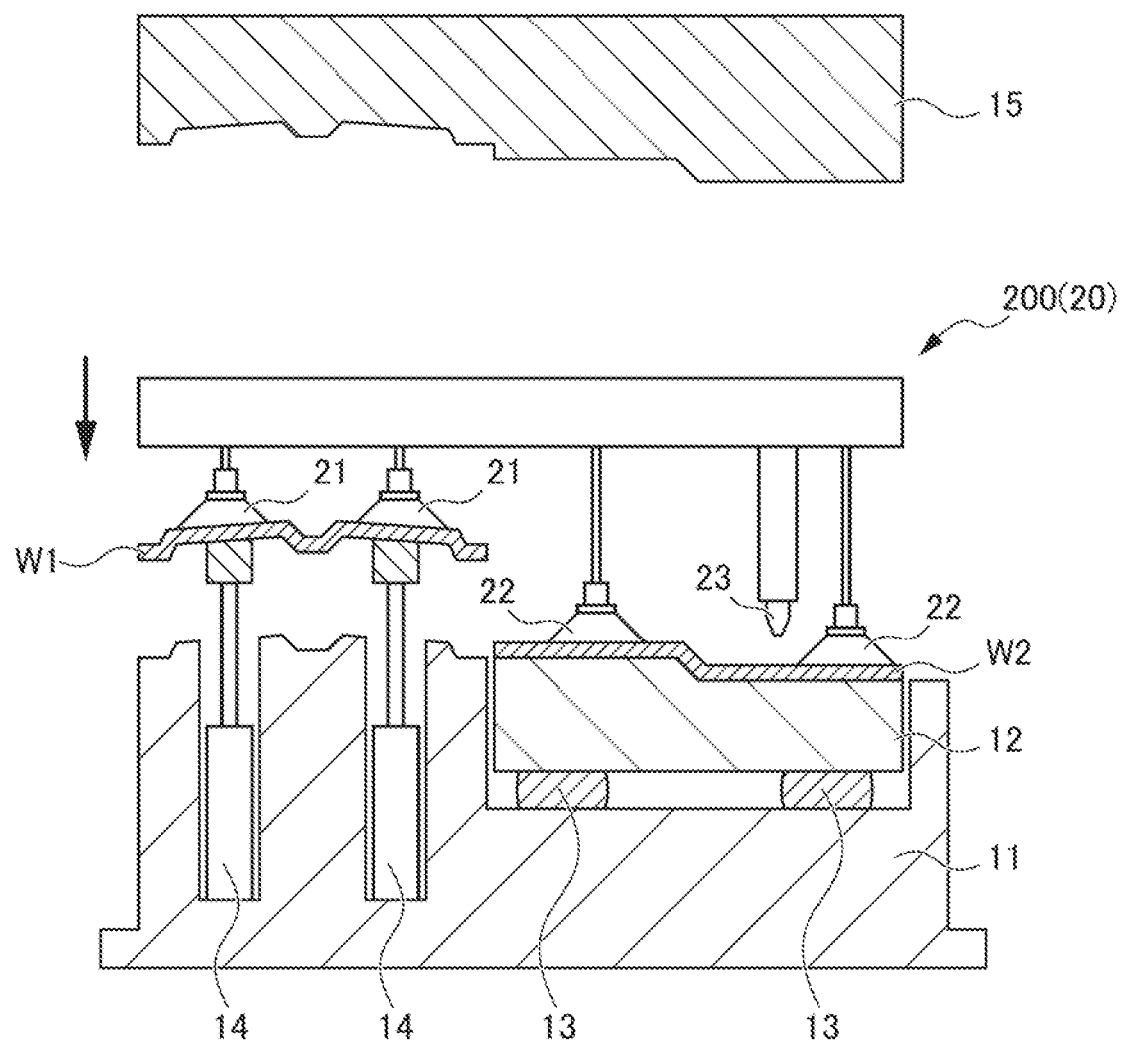
FIG. 5 is a diagram illustrating a state in which the conveying part 200 is lowered to suction and hold a product part W1 and a scrap part W2.

FIG. 5 is a diagram illustrating a state in which the conveying part 200 is lowered, and suctions and holds the product part W1 and the scrap part W2. When the conveying part 200 is lowered, the conveying part 200 is controlled by the controller 27 to cause the product vacuum cups 21 and the scrap vacuum cups 22 to suction and hold the product part W1 and the scrap part W2, respectively. At this time, the lift-up parts 14 lift the formed product part W1 to the position higher than the cut scrap part W2. Therefore, the product part W1 is suctioned and held at the position higher than the scrap part W2.

Figure 6:
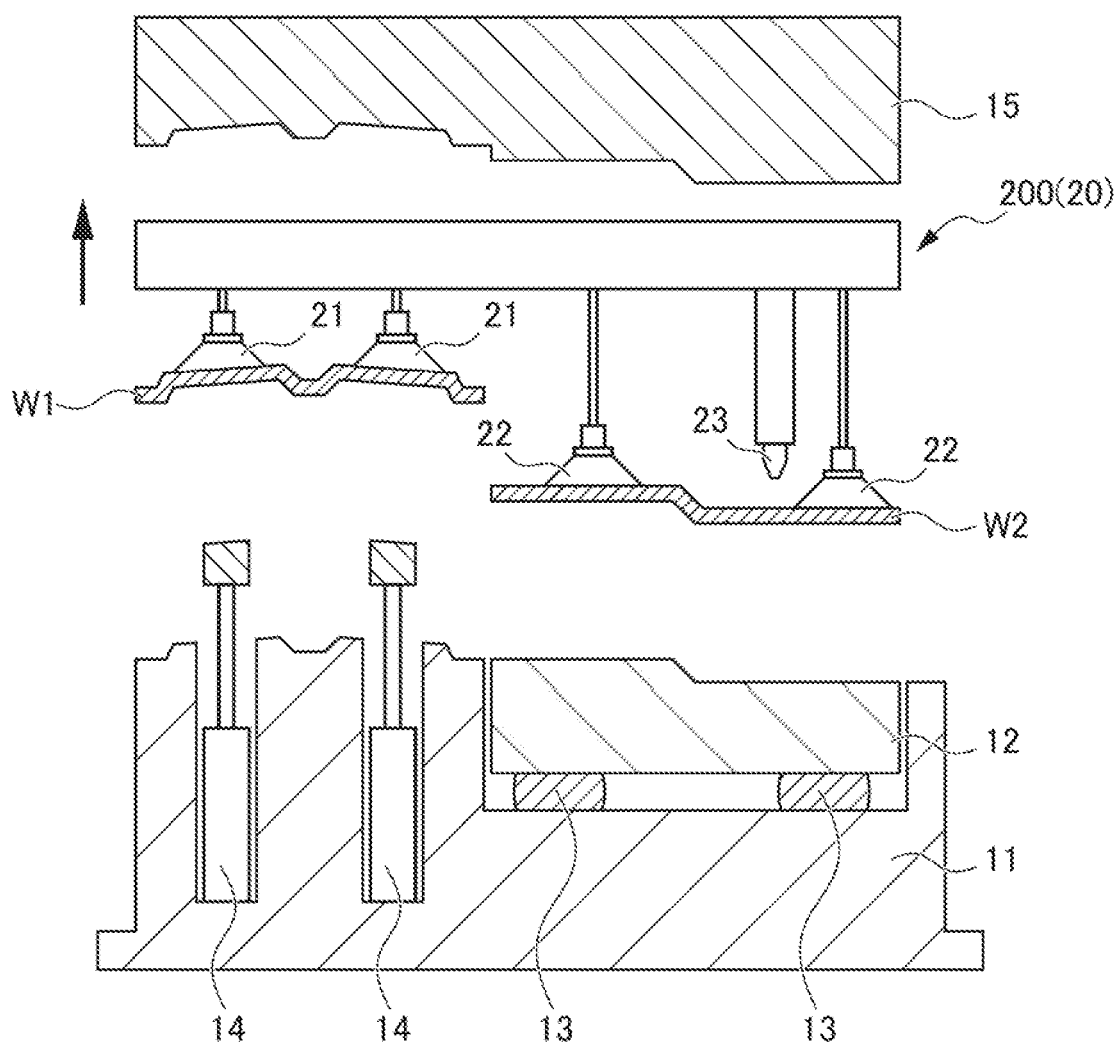
FIG. 6 is a diagram illustrating a state in which the conveying part 200 is raised while suctioning and holding the product part W1 and the scrap part W2.

FIG. 6 is a diagram illustrating a state in which the conveying part 200 is raised while the product part W1 and the scrap part W2 are suctioned and held. The conveying part 200 is raised, so that both the product part W1 and the scrap part W2 are separated from the lower die 11 and the blank holder 12 respectively to be brought into a conveyable state by the conveying part 200.

Figure 7:
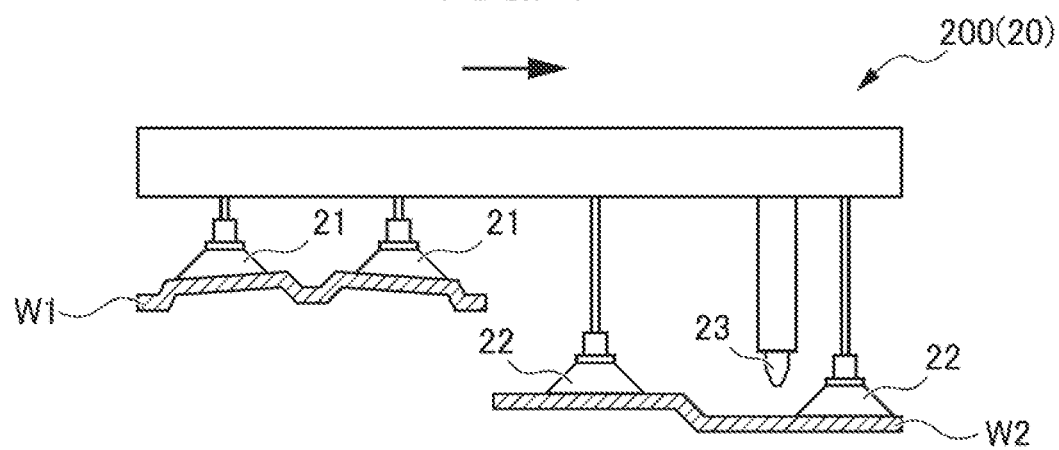
FIG. 7 is a diagram illustrating an initial state of conveyance.

FIG. 7 is a diagram illustrating an initial state of conveyance. The conveying part 200 moves away from the press forming device 10 toward an apparatus for performing a next process at a high speed while suctioning and holding the product part W1 and the scrap part W2.

Figure 8:
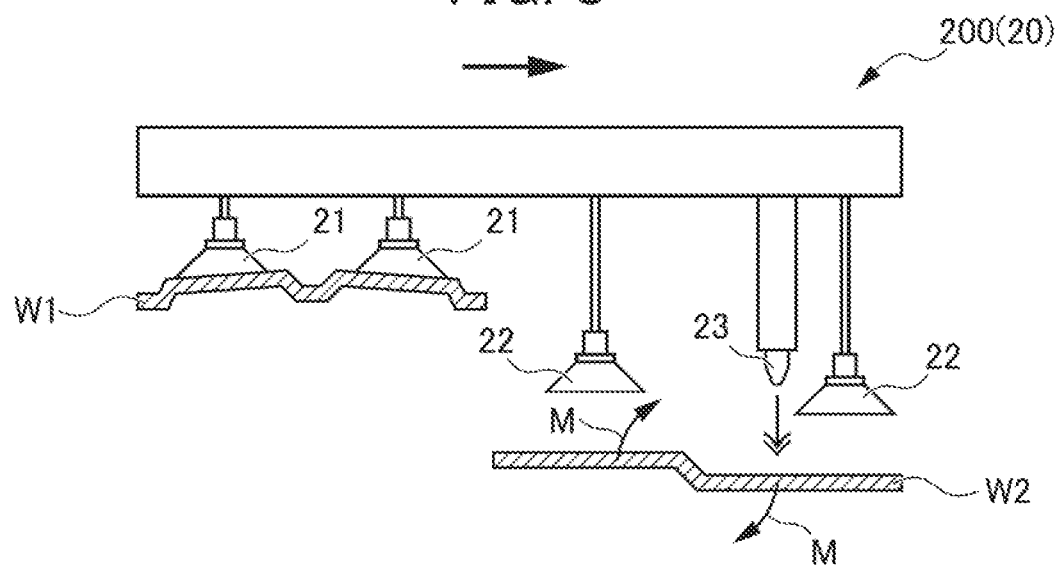
FIG. 8 is a diagram illustrating a state in which suction holding of the scrap part W2 is released in the middle of conveyance, and high pressure air is discharged from a nozzle part 23.

FIG. 8 is a diagram illustrating a state in which the suction holding of the scrap part W2 is released, and high pressure air is discharged from the nozzle part 23 in the middle of the conveyance. The conveying device 20 of this embodiment releases the suction holding of the scrap part W2 in a state of conveying and moving at a high speed. Herein, when the suction holding of the scrap part W2 is simply released during the conveying movement, the scrap part W2 flies far away while maintaining the same momentum as if the scrap part W2 were projected due to inertia.

Therefore, in the conveying device 20 of this embodiment, high pressure air is ejected from the nozzle part 23 to the scrap part W2 immediately after the suction holding is released, and the scrap part W2 is dropped into a predetermined underground pit opening D. Herein, as described above, the nozzle part 23 is disposed so as to be directed toward the portion on the downstream side in the conveying direction of the scrap part W2 with respect to the gravity center position of the scrap part W2. Therefore, the impulse in the rotation direction indicated by the arrow in FIG. 8 is applied to the scrap part W2.

Figure 9:
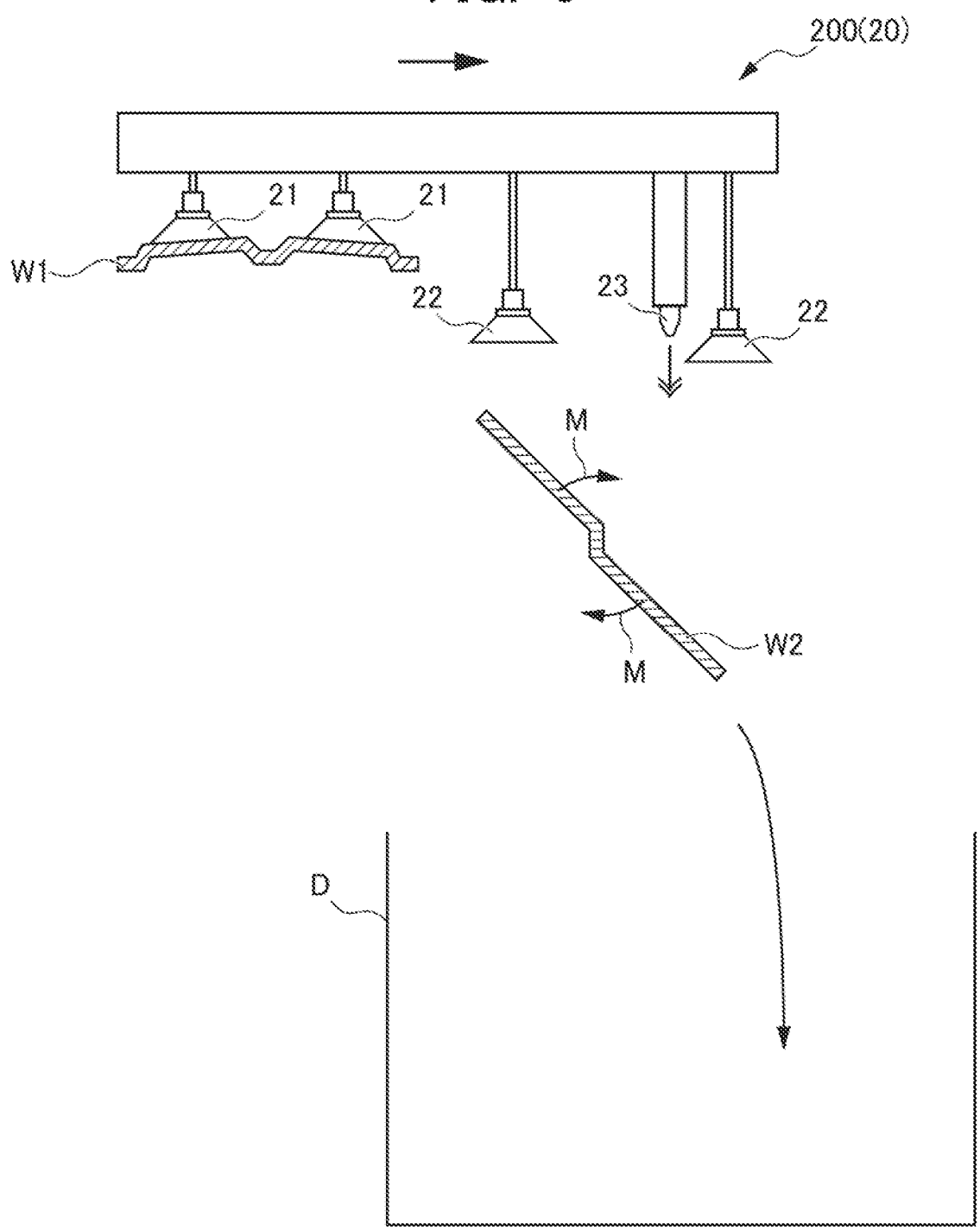
FIG. 9 is a diagram illustrating a state in which the scrap part W2 is dropped.

FIG. 9 is a diagram illustrating a state in which the scrap part W2 drops. When the scrap part W2 rotates, air resistance increases with respect to the conveying direction in which the scrap part W2 advances so far, the scrap part W2 stalls, and the scrap part W2 drops downward at a stretch and can be dropped into the predetermined underground pit opening D. The conveying device 20 that releases the suction holding of the scrap part W2 conveys the product part W1 to a next processing step.

In the example described above, the description is made with a simplified diagram in order to facilitate understanding of the configuration. However, an actual product has a more complicated form. Therefore, in the following, the arrangement of the scrap vacuum cups 22 and the nozzle part 23 will be described with reference to a more specific form as an example.

FIG. 10 is a top view illustrating the arrangement of the scrap vacuum cups 22 and the nozzle part 23 in the more specific form of the scrap part W2. FIG. 11 is a side view illustrating the arrangement of the scrap vacuum cups 22 and the nozzle part 23 in the more specific form of the scrap part W2. In each of FIGS. 10 and 11, the direction of the arrow F indicates the conveying direction of the conveying part 200. Further, in each of FIGS. 10 and 11, reference numeral G denotes the gravity center position of the scrap part W2. The scrap vacuum cups 22 is desirably disposed so as to surround the gravity center position G in order to improve stability during conveyance. Further, for the same reason, the scrap vacuum cups 22 are desirably disposed at three or more places, but the specific number is adjusted in accordance with the weight of the scrap part W2. The nozzle part 23 is desirably disposed on the side where moment is generated in order to achieve a target dropping posture, and is disposed at a position as far as possible from the gravity center position G in order to maximize the generated moment and actively rotate the nozzle part 23. Further, the number of nozzle parts 23 to be disposed may be adjusted in accordance with the moment of inertia of the scrap part W2.

Thus, in the conveying device 20 of this embodiment, the scrap part W2 which is discharged from the machining process in the press forming device 10 and is being suctioned and conveyed toward a next machining process is released from suction during conveyance while maintaining a normal conveyance speed, and then impulse is immediately applied to the scrap part W2, and a speed vector toward the predetermined underground pit opening D on the upstream side of a next machining process is applied to the scrap part W2. Normally, the scrap part W2 is suctioned and held by a plurality of the scrap vacuum cups 22. When the timing of suction release varies in the individual scrap vacuum cups 22, the posture of the scrap part W2 at the start of the drop also varies. Therefore, it is necessary to suppress the suction release timing within several ms by using a solenoid valve or the like. For the same reason, impulse addition (air discharge by the nozzle part 23) should not be started until all the suction release of the plurality of scrap vacuum cups 22 that suction and hold the scrap part W2 is completed.

As a method of adding impulse, compressed air is introduced into the nozzle part 23 attached to the conveying device due to the weight capacity limitation of the conveying device. With this method, the compressed air ejected from the nozzle part 23 follows the dropping scrap part W2, so that force can be continuously applied and a large amount of time can be taken out of the impulse amount. As a result, force to be added is reduced, and therefore it is possible to reduce the size and weight of an impulse addition device.

Furthermore, a required impulse amount is large only by applying a simple velocity vector, and the weight of an air hose exceeds the weight capacity when the instantaneous air flow rate for the above purpose tries to be secured. Therefore, the scrap part W2 is intentionally rotated forward or backward, so that the dropping trajectory is controlled such that a flight distance is shortened by utilizing the air resistance during rotation, and the required impulse amount is reduced. An angular moment is applied to the scrap part W2, and therefore an impulse addition position is disposed on the downstream side with respect to the center of gravity of the scrap part W2 in a case of forward rotation, or on upstream side with respect to the center of gravity of the scrap part W2 in a case of backward rotation, on a straight line that passes through the center of gravity of the scrap part W2 and is parallel to the conveying direction.

At this time, in order to reduce the amount of used air, while it is desirable to move the impulse addition position as close to the scrap part W2 terminal side as possible so as to actively rotate the scrap part W2, it is necessary to be careful not to cause compressed air ejected from the nozzle part 23 to miss striking the scrap part W2. A target of air ejection time is desirably around 100 ms in consideration of prevention of missed strike due to the rotation of the scrap part W2. In a case where the scrap part W2 has a U-shape or the like, an actual shape does not exist on the above straight line, and the air nozzle for applying impulse cannot be disposed at the target position, the pipe may be branched in the middle to be disposed in the direction perpendicular to the conveying direction in a dispersive manner, and their resultant force may be located at an original target position.

Regarding the impulse amount required by the scrap part W2, a regression equation of a discharge trajectory of the scrap part W2 is experimentally obtained in advance, and a discharge trajectory/flight distance can be controlled with a variation width of $\sigma=0.2$ [m] by a total of seven explanatory variables of (1) the shape of the scrap part W2, (2) the weight of the scrap part W2, (3) the discharge speed of the scrap part W2 (obtained from scrap part W2 plane layout and production speed), (4) the angle at which the impulse is added, (5) the magnitude of the impulse, (6) the forward or backward rotation to be generated, and (7) left or right rotation. Then, characteristic values (1), (2), (3) of the scrap part W2 and the target flight distance of the scrap part W2 are calculated from the design drawing, and (4) and (7) are fixed values regardless of the scrap part W2, and (5) can be obtained by applying (6) as a fixed value according to the type of (1).

In (5), fine adjustment using a speed control valve is possible in proportion to the air flow rate. However, in order to simplify this adjustment, the required impulse amount is set within a range of σ=0.2 [m], and several types of nozzle parts 23 having different inner diameters are selected and attached in accordance with the required impulse amount.

In order to prevent the terminal of the scrap part W2 from contacting and deforming the product part W1 that is simultaneously conveyed at the start of the dropping of the scrap part W2, the scrap part W2 is conveyed at a position lower than the product (on the floor side) during suction conveyance. Therefore, the lower die 11 is provided with the lift-up parts 14, and after the forming is completed, only the product part W1 is lifted up before the product part W1 and the scrap part W2 are discharged. Thus, it is possible to prevent the scrap part W2 from coming into contact with the product part W1 when the scrap part W2 rotates, and therefore the scrap part W2 can be reliably discharged. More specifically, due to the discharge of high pressure air from the nozzle part 23, the scrap part W2 rotates about the center of gravity of the scrap part W2, but the side of the scrap part W2 opposite to the nozzle part 23 side with the center of gravity therebetween rotates upward. Although the scrap part W2 may drop due to gravity, when the conveyance speed is high, there is a risk that the side of the scrap part W2 opposite to the nozzle part 23 side is higher than the product part. The moving speed of the scrap part W2 in the conveying direction decreases due to air resistance, and therefore there is a possibility that so that the scrap part W2 does not drop into the underground pit opening D due to contact of the scrap part W2 and the product part W1, and is placed on the die. Before the product part W1 and the scrap part W2 are discharged after the forming is completed, only the product part W1 is lifted up, so that it is possible to prevent such a problem. The scrap vacuum cups 22 that suction the scrap part W2 are each held in the conveying device 20 via a driving means such as a hydraulic cylinder, and after suction together with the product part W1, the cylinders may be extended to make the scrap part W2 lower than the product.

As described above, in the conveying device 20 of this embodiment, high pressure air from the nozzle part 23 is discharged in the middle of conveyance of both the product part W1 and the scrap part W2, so that only the scrap part W2 is dropped properly at a predetermined position. Consequently, it is possible to separate the scrap part W2 during conveyance, and control the drop trajectory, and when the scrap and the pressed product are simultaneously conveyed without sacrificing cycle time, only the scrap can be reliably discharged. In addition, it is possible to obtain the following further effects.

Effect 1

It is possible to integrate a drawing process and a cutting process, and it is possible to set a process that has a new forming function in a vacant post-process.

Effect 2

It is not necessary to set a tunnel structure for discharging the scrap part inside the die, and it is possible to improve rigidity of a normal cutting process die. As a result, change in a cut clearance of upper and lower blades due to die deflection is suppressed, it is possible to suppress generation of chips from a panel cross section due to failure of cut forming, and deformation of a product due to pressing by an upper die plate caused by adhesion of the generated chips on a design surface, and it is possible to improve product quality. That is, a production line downtime for a chip removal process is reduced, and productivity is improved.

Effect 3

It is not necessary to set a tunnel structure inside the die, and catching of the scrap part W2 in a frontage of a tunnel, which is usually generated in a cutting process, is not generated. That is, the production line downtime for removal of clogged scrap part W2 is eliminated, and the productivity is improved.

EXPLANATION OF REFERENCE NUMERALS 10 press forming device
11 lower die
12 blank holder
13 cushion part
14 lift-up part
15 upper die
20 conveying device
21 product vacuum cup
22 scrap vacuum cup
23 nozzle part
24 conveyance driving part
25 solenoid valve
26 suction pressure generator
26a solenoid valve
27 controller
200 conveying part
D underground pit opening
W1 product part
W2 scrap part

What is claimed is:
1. A conveying device for use in press forming, the conveying device comprising:
a conveying part that includes respective holding parts for holding a product part and a scrap part of a workpiece after a cutting process, and conveys the product part and the scrap part to a next process;
a nozzle part that is provided separately from the holding parts in the conveying part, and discharges compressed fluid toward the scrap part; and
a controller that performs a control to release holding of the scrap part during conveyance of the workpiece and to blow the compressed fluid toward the scrap part.
2. The conveying device according to claim 1, wherein the nozzle part is disposed so as to be directed toward a portion on a downstream side or an upstream side in a conveying direction of the scrap part with respect to a gravity center position of the scrap part.

3. The conveying device according to claim 1, wherein the conveying part holds and conveys the scrap part at a position lower than the product part.

4. The conveying device according to claim 1, wherein the nozzle part is disposed so as to be directed toward a portion on a downstream side or an upstream side in a conveying direction of the scrap part with respect to a gravity center position of the scrap part, and the conveying part holds and conveys the scrap part at a position lower than the product part.

\* \* \* \* \*